United States Patent
Yao

(10) Patent No.: US 7,518,833 B2
(45) Date of Patent: Apr. 14, 2009

(54) MICRO-ACTUATOR WITH ELECTRIC SPARK PREVENTING STRUCTURE, HGA, AND DISK DRIVE UNIT WITH THE SAME, AND MANUFACTURING METHOD THEREOF

(75) Inventor: MingGao Yao, DongGuan (CN)

(73) Assignee: SAE Magnetics H.K. Ltd., Hong Kong (CN)

( * ) Notice: Subject to any disclaimer, the term of this patent is extended or adjusted under 35 U.S.C. 154(b) by 531 days.

(21) Appl. No.: 11/273,075

(22) Filed: Nov. 15, 2005

(65) Prior Publication Data

US 2007/0109689 A1 May 17, 2007

(51) Int. Cl.
*G11B 5/56* (2006.01)
(52) U.S. Cl. .................................... 360/294.4
(58) Field of Classification Search ............... 360/294.4
See application file for complete search history.

(56) References Cited

U.S. PATENT DOCUMENTS

| | | | |
|---|---|---|---|
| 5,299,081 A | 3/1994 | Hatch et al. | |
| 5,611,707 A | 3/1997 | Meynier | |
| 5,636,089 A | 6/1997 | Jurgenson et al. | |
| 5,898,544 A | 4/1999 | Krinke et al. | |
| 6,198,606 B1 | 3/2001 | Boutaghou et al. | |
| 6,538,836 B1 | 3/2003 | Dunfield et al. | |
| 6,617,763 B2 | 9/2003 | Mita et al. | |
| 6,624,984 B2 | 9/2003 | Lewis et al. | |
| 6,671,131 B2 | 12/2003 | Kasajima et al. | |
| 6,700,727 B1 | 3/2004 | Crane et al. | |
| 6,700,749 B2 | 3/2004 | Shiraishi et al. | |
| 6,728,077 B1 * | 4/2004 | Murphy | 360/294.4 |
| 6,950,266 B1 | 9/2005 | McCaslin et al. | |
| 7,050,271 B2 * | 5/2006 | Miyano et al. | 360/294.4 |
| 7,119,994 B2 * | 10/2006 | Miyano et al. | 360/294.4 |
| 7,130,160 B2 * | 10/2006 | Kwon et al. | 360/294.7 |
| 7,277,259 B2 * | 10/2007 | Yamamoto et al. | 360/294.4 |
| 2003/0147177 A1 | 8/2003 | Yao et al. | |
| 2003/0147181 A1 | 8/2003 | Shiraishi et al. | |

(Continued)

FOREIGN PATENT DOCUMENTS

JP  2002-74871  3/2002

(Continued)

OTHER PUBLICATIONS

U.S. Appl. No. 11/238,998, filed Sep. 2005, Yang et al.

(Continued)

*Primary Examiner*—Allen T Cao
(74) *Attorney, Agent, or Firm*—Nixon & Vanderhye P.C.

(57) ABSTRACT

A micro-actuator includes a metal frame having two side arms, a top support arm and a bottom support arm respectively connected with the top ends of the two side arms. The two side arms are in parallel with and spaced from each other a distance adapted to hold a slider therebetween that is mounted on the top support arm. An isolation layer is coupled with each side arm of the metal frame; and a piezoelectric element is bonded with the isolation layer. When operating the micro-actuator, an electric sparking problem will not occur for existence of the isolation layer. The invention also disclose a method of manufacturing the micro-actuator, a HGA and disk drive unit with the micro-actuator.

22 Claims, 9 Drawing Sheets

U.S. PATENT DOCUMENTS

| | | |
|---|---|---|
| 2003/0168935 A1 | 9/2003 | Ogawa et al. |
| 2006/0023338 A1 | 2/2006 | Sharma et al. |
| 2006/0050442 A1 | 3/2006 | Yao et al. |
| 2006/0072247 A1 | 4/2006 | Yao et al. |
| 2006/0082917 A1 | 4/2006 | Yao et al. |
| 2006/0098347 A1 | 5/2006 | Yao et al. |
| 2006/0146449 A1 | 7/2006 | Yao et al. |

FOREIGN PATENT DOCUMENTS

| | | |
|---|---|---|
| JP | 2002-133803 | 5/2002 |

OTHER PUBLICATIONS

U.S. Appl. No. 11/169,019, filed Jun. 2005, Yao et al.
U.S. Appl. No. 11/080,659, filed Mar. 2005, Yao et al.
U.S. Appl. No. 11/050,823. filed Jan. 2005, Yao et al.
U.S. Appl. No. 11/080,657, filed Mar. 2005, Zhu et al.
U.S. Appl. No. 11/235,549, filed Sep. 2005, Yao et al.
U.S. Appl. No. 11/304,623, filed Dec. 2005, Yao et al.
U.S. Appl. No. 11/169,003, filed Jun. 2005, Yao et al.
U.S. Appl. No. 11/125,248, filed May 2005, Yao et al.
U.S. Appl. No. 11/263,998, filed Nov. 2005, Yao.
U.S. Appl. No. 11/265,385, filed Nov. 2005, Yao et al.
U.S. Appl. No. 11/192,121, filed Jul. 2005, Yao et al.
U.S. Appl. No. 11/304,544, filed Dec. 2005, Yao.
U.S. Appl. No. 11/300,339, filed Dec. 2005, Yao et al.
U.S. Appl. No. 11/385,704, filed Mar. 2006, Yao et al.
U.S. Appl. No. 11/385,698, filed Mar. 2006, Yao et al.
U.S. Appl. No. 11/319,577, filed Dec. 2005, Yao et al.
U.S. Appl. No. 11/353,018, filed Feb. 2006, Yao.
U.S. Appl. No. 11/319,580, filed Dec. 2005, Yao et al.
U.S. Appl. No. 11/384,404, filed Mar. 2006, Yao.
U.S. Appl. No. 11/414,546, filed May 2006, Yao et al.
U.S. Appl. No. 11/440,354, filed May 2006, Li.

* cited by examiner

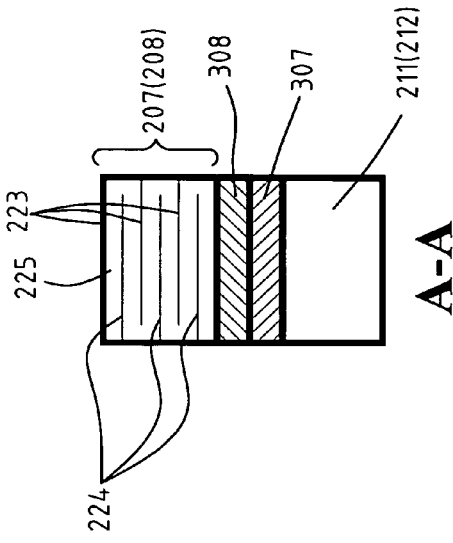
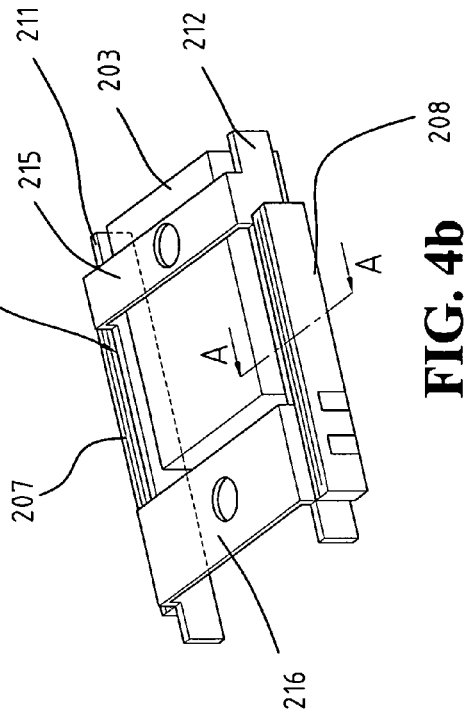
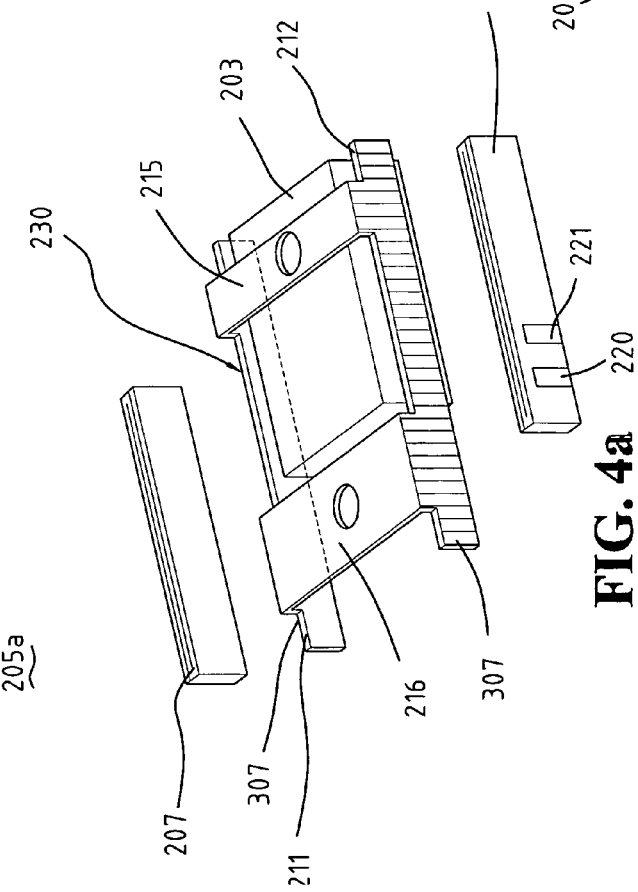
FIG. 4a
FIG. 4b
FIG. 4C
A-A

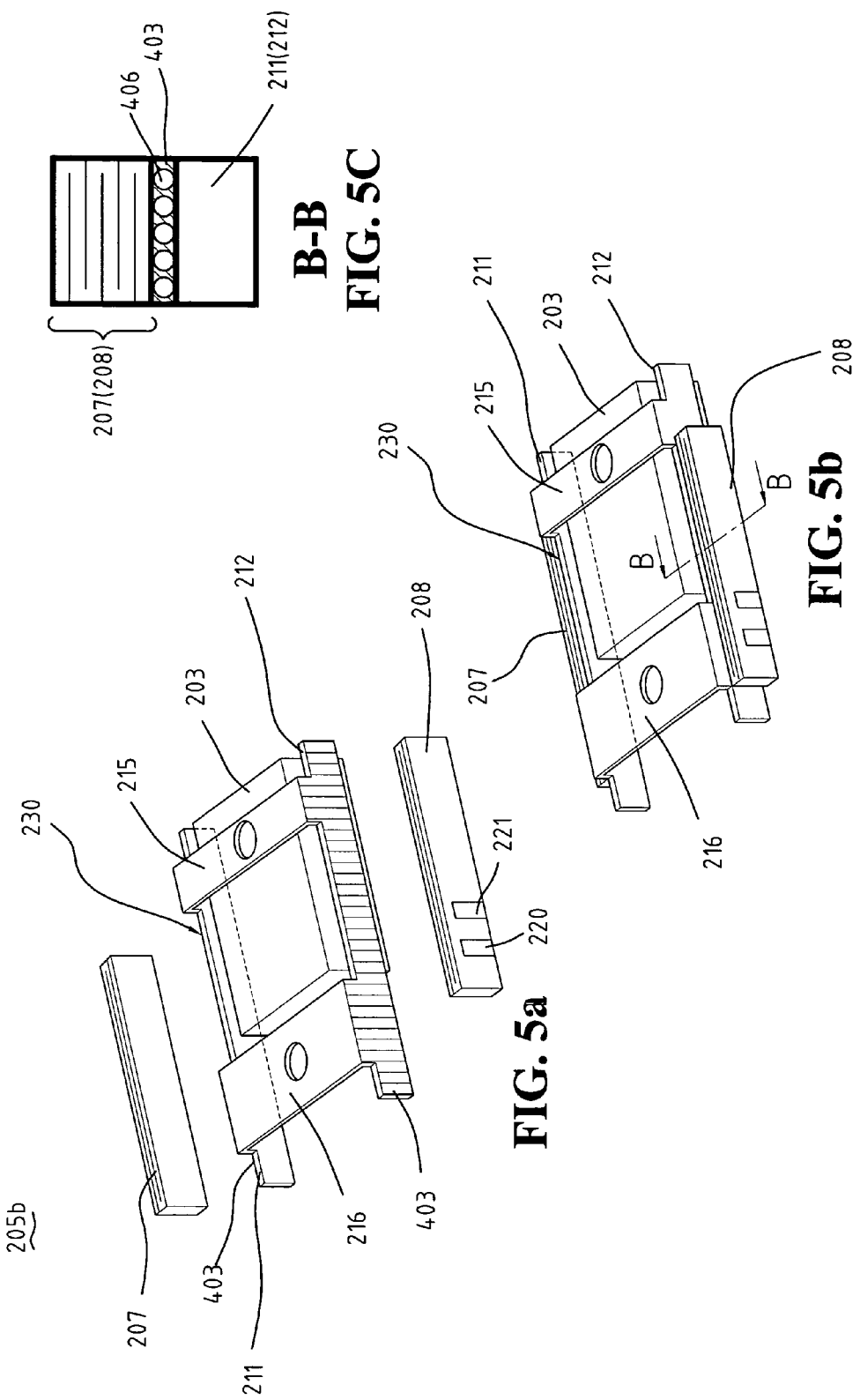

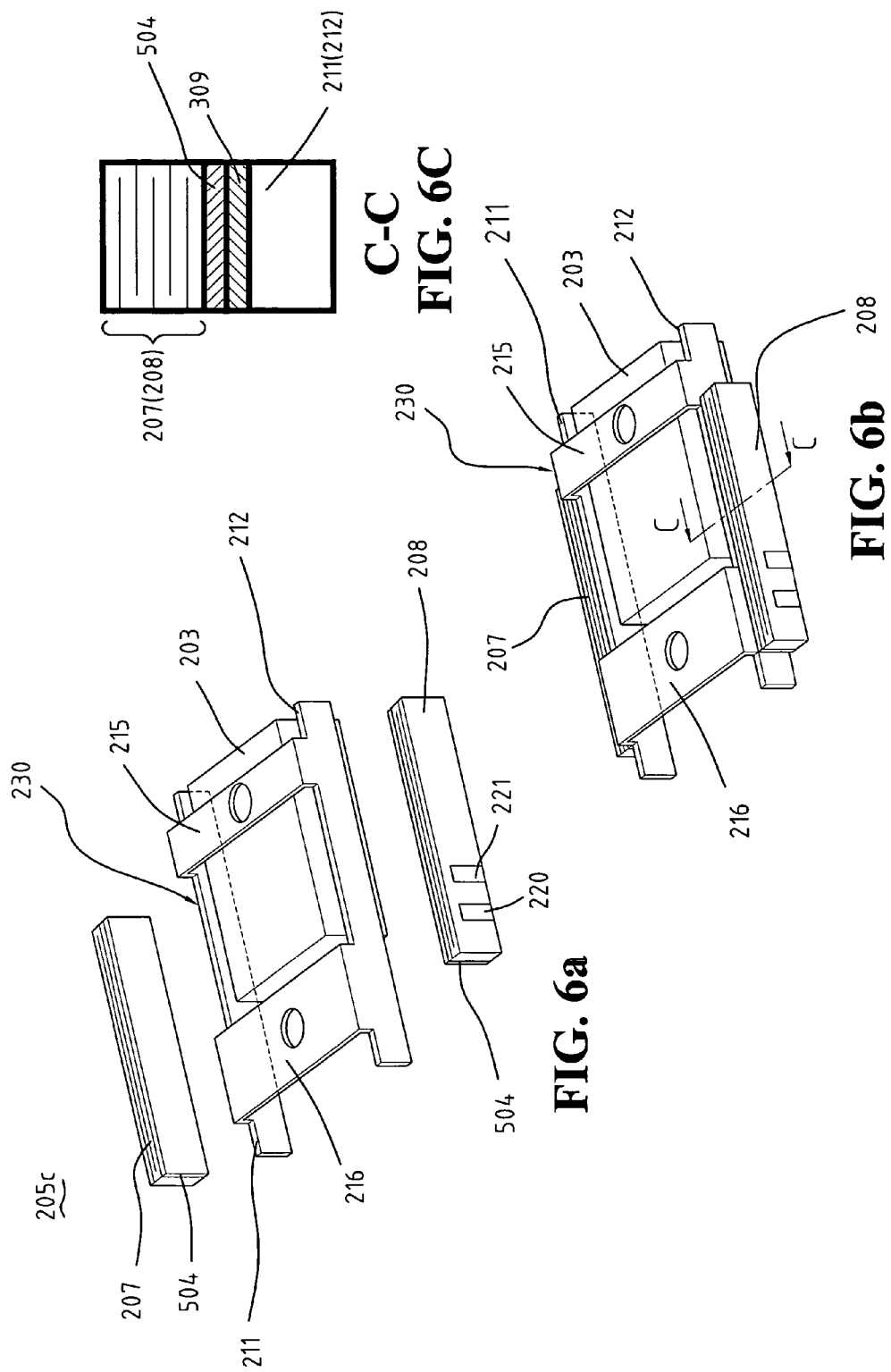

MICRO-ACTUATOR WITH ELECTRIC SPARK PREVENTING STRUCTURE, HGA, AND DISK DRIVE UNIT WITH THE SAME, AND MANUFACTURING METHOD THEREOF

BACKGROUND OF THE INVENTION

1. Field of the Invention

The present invention relates to an information recording disk drive unit, and in particular to a micro-actuator of the disk drive unit with electric spark preventing structure and manufacturing method thereof.

2. The Prior Arts

Disk drives are information storage devices that use magnetic media to store data. The structure of a conventional disk drive is illustrated in FIG. 1. The conventional disk drive comprises a casing 701 containing a set of circular disks 702 each having a surface on which a magnetic coating is provided for forming a plurality of concentric tracks (not shown). The disks 702 are mounted on a spindle motor 703 that selectively spins the disks 702. A drive arm 704 is arranged in the casing 701 and is controlled by a voice-coil motor (VCM) 707 to drive a head gimbal assembly (HGA) 705 with respect to the disks 702, whereby a micro-actuator with a head slider received therein carried by the HGA 705 is movable across the surface of the disk 702 from track to track for reading data from or writing data to the disk.

However, because the large inertia of the VCM 707, the slider cannot attain a quick and fine position control that limits the servo bandwidth of the disk drive, That affects the capacity increasing of the HDD.

In order to solve the above-mentioned problem, a piezoelectric (PZT) micro-actuator is employed to modify the displacement (off-track) of the slider. The PZT micro-actuator has higher frequency components than the VCM and corrects the displacement of the slider in a much smaller scale to compensate for errors caused by the VCM. The PZT micro-actuator enables the head work well in a smaller recording track width, thereby increasing the value of "tracks per inch (TPI)" by 50% of the disk drive unit and thus increasing disk surface recording density and drive performance of the disk drive unit. Such as reduces the head seeking and settling time.

Referring to FIG. 2a, a conventional HGA 277 comprises a suspension 213 to load a PZT micro-actuator 205 with a slider 203 received therein. The suspension 213 comprises conductive traces 210a, 210b that are connected to the slider 203 and the PZT micro-actuator 205, respectively.

Referring to FIG. 2b, the PZT micro-actuator 205 comprises a metal frame 230 having two side arms 211, 212, a top support arm 215 and a bottom support arm 216 respectively connected with the top ends of the two side arms 211, 212. The two side arms 211, 212 are in parallel with and spaced from each other a distance adapted to hold a slider 203 therebetween that is mounted on the top support arm 215. The top support arm 215 and the bottom support arm 216 are in parallel with each other; and the top support arm 215 is in parallel with a surface of the slider 203. Two PZT elements 207, 208 are respectively mounted by for example epoxy on outside surfaces of the two side arms 211, 212 for actuation. Also referring to FIGS. 2d, the two PZT elements 207, 208 each has a multi-layered structure of alternately laminating piezoelectric material layers 225 and two electrodes 223, 224. Two electrical contact pads 220, 221 are coupled to the electrodes 223, 224, respectively.

Referring to FIGS. 2c, the PZT micro-actuator 205 is coupled to a tongue (not labeled) of the suspension 213 of the HGA 277 on the bottom support arm 216 by epoxy or laser welding. A plurality of electrical connection balls 209a, such as gold ball bonding (GBB) and solder ball bonding (SBB), on each one side of the PZT elements 207, 208 connect the electrical contact pads 220, 221 of the PZT elements 207, 208 laminated on the side arms 211, 212 of the micro-actuator 205 to the conductive traces 210a. In addition, metal balls 209b, such as GBB and SBB, electrically connect the slider 203 to the conductive traces 210b for electrical connection of the read/write transducers. When an actuating power is applied through the conductive traces 210a, the PZT elements 207, 208 on the side arms 211, 212 will expand or contract, causing the side arms 211, 212 to bend in a common lateral direction. The bending causes a shear deformation of the metal frame 230. Its rectangular shape becomes approximately a parallelogram. The slider 203 undergoes a lateral translation because the slider 203 is attached to the moving side (support arm 215) of the parallelogram. Thus, a fine head position adjustment can be attained.

However, referring to FIG. 3, when a voltage is input to operate the micro-actuator 205, an electric spark 303 will happen since the bottom surfaces of the PZT elements 207, 208 are electrodes with an operate voltage and the metal frame 230 is a common ground while the bonding epoxy is very thin (less than 5 μm). This is why the electric spark problem happens between the metal frame 230 and the PZT elements 207, 208 when the environment condition changes during the micro-actuator operation. Hence, it is desired to provide a micro-actuator of the disk drive unit with electric spark preventing structure and a manufacturing method thereof.

In addition, to get an enough stiffness to support the slider during the flying, it is needed for the frame to have an enough thickness. This will cause a difficulty for the frame manufacturing for example the shape etching or molding, and the frame forming. The thick frame material will make the manufacturing process difficult and the cost expensive. Hence, the present invention is to provide with a design to reduce the frame thinner and get similar performance, in addition, to achieve a lower cost and a flexible manufacturing process.

SUMMARY OF THE INVENTION

A main aspect of the present invention is to provide a method and structure of preventing electric spark for a micro-actuator of a disk drive unit when operating the micro-actuator.

Another aspect of the present invention is to provide a micro-actuator, which has a structure for preventing electric spark.

A further aspect of the present invention is to provide a HGA, which has a structure for preventing electric spark of its micro-actuator.

A fourth aspect of the present invention is to provide a disk drive unit, which has a structure for preventing electric spark of its micro-actuator.

To achieve the above-mentioned aspects, in accordance with the present invention, a micro-actuator comprises a metal frame having two side arms, and at least one support arm connected with the two side arms. The two side arms is in parallel with and spaced from each other a distance adapted to hold a slider therebetween that is mounted on the support arm. An isolation layer is coupled with each side arm of the metal frame and a piezoelectric element is to bond with the isolation layer. Thus, upon a voltage input to operate the micro-actuator, since the metal frame is insulated with the piezoelectric element, an electric spark problem will not occur.

In accordance with a first aspect of the present invention, the isolation layer is an insulated layer laminated on each side arm of the metal frame.

In accordance with a second aspect of the present invention, the isolation layer is an epoxy layer with spacers, which is used for mounting the piezoelectric element with each side arm of the metal frame and keeping them from a specified distance.

In accordance with a third aspect of the present invention, the isolation layer is a substrate layer formed on the piezoelectric element.

In accordance with a fourth aspect of the present invention, the isolation layer is an inactive layer that is a bottom layer of a multi-layered structure of the piezoelectric element and is not polarized.

In addition, since using a metal plate to form a main portion of the micro-actuator, the micro-actuator will be improved in the shape and/or size thereof. Thus, it is enabled to design the micro-actuator with a sufficient stroke. Furthermore, because the metal plate can be easily and precisely machined, a lower cost and a flexible manufacturing process can be attained.

Further, according to the present invention, a method for manufacturing a micro-actuator of a disk drive unit with electric spark preventing structure, comprising a step of providing a metal frame having two side arms, at least one support arm connected with the two side arms, the two side arms being in parallel with and spaced from each other a distance adapted to hold a slider therebetween that is mounted on the support arm; a step of forming an insulated layer to couple with each side arm of the metal frame; and a step of providing a piezoelectric element to bond with the insulated layer.

According to an embodiment of the invention, the insulated layer is formed by being laminated on each side arm of the metal frame. Selectively, the insulated layer is formed by using an epoxy with spacers to mount the piezoelectric element to each side arm of the metal frame. According to another embodiment, the insulated layer is formed by providing a substrate layer on a surface of the piezoelectric element that is coupled with each side arm of the metal frame. Possibly, the insulated layer is formed by providing an inactive layer on a bottom layer of a multi-layered structure of the piezoelectric element having formed that is coupled with each side arm of the metal frame.

A HGA of the present invention comprises a slider; a micro-actuator; and a suspension to load the slider and the micro-actuator; wherein the micro-actuator comprising: a metal frame having two side arms, and at least one support arm connected with the two side arms, the two side arms being in parallel with and spaced from each other a distance adapted to hold the slider therebetween that is mounted on the support arm; an isolation layer coupled with each side arm of the metal frame; and a PZT element to bond with the isolation layer.

A disk drive unit of the present invention comprises a HGA including a micro-actuator, a slider, and a suspension that supports the micro-actuator and slider; a drive arm connected to the HGA; a disk; and a spindle motor operable to spin the disk; wherein the micro-actuator comprising: a metal frame having two side arms, and at least one support arm connected with the two side arms, the two side arms being in parallel with and spaced from each other a distance adapted to hold the slider therebetween that is mounted on the support arm; an isolation layer coupled with each side arm of the metal frame; and a piezoelectric element to bond with the isolation layer.

In comparison with the conventional devices, since the conventional devices are to directly mount the piezoelectric element to the metal frame, it is easy to cause the electric spark problem. However, in the present invention, an isolation layer is formed between and coupled with the piezoelectric element and the metal frame. This is going to prevent the electric spark problem.

The present invention will become more obvious from the following description when taken in connection with the accompanying drawings, which show, for purposes of illustration only, preferred embodiments in accordance with the present invention. In the drawings:

BRIEF DESCRIPTION OF THE DRAWINGS

FIG. 4a illustrates a detail structure view of a micro-actuator constructed in accordance with a first embodiment of the present invention with a slider received therein;

FIG. 4b is an assembled view of FIG. 4a;

FIG. 4c is an enlarged cross-sectional view of a side arm with a piezoelectric element mounted thereon constructed in accordance with the first embodiment of the present invention, which is taken along line A-A in FIG. 4b;

FIG. 5a illustrates a detail structure view of a micro-actuator constructed in accordance with a second embodiment of the present invention with a slider received therein;

FIG. 5b is an assembled view of FIG. 5a;

FIG. 5c is an enlarged cross-sectional view of a side arm with a piezoelectric element mounted thereon constructed in accordance with the second embodiment of the present invention, which is taken along line B-B in FIG. 5b;

FIG. 6a illustrates a detail structure view of a micro-actuator constructed in accordance with a third embodiment of the present invention with a slider received therein;

FIG. 6b is an assembled view of FIG. 6a;

FIG. 6c is an enlarged cross-sectional view of a side arm with a piezoelectric element mounted thereon constructed in accordance with the third embodiment of the present invention, which is taken along line C-C in FIG. 6b;

DETAILED DESCRIPTION OF THE PREFERRED EMBODIMENTS

Figure 1:
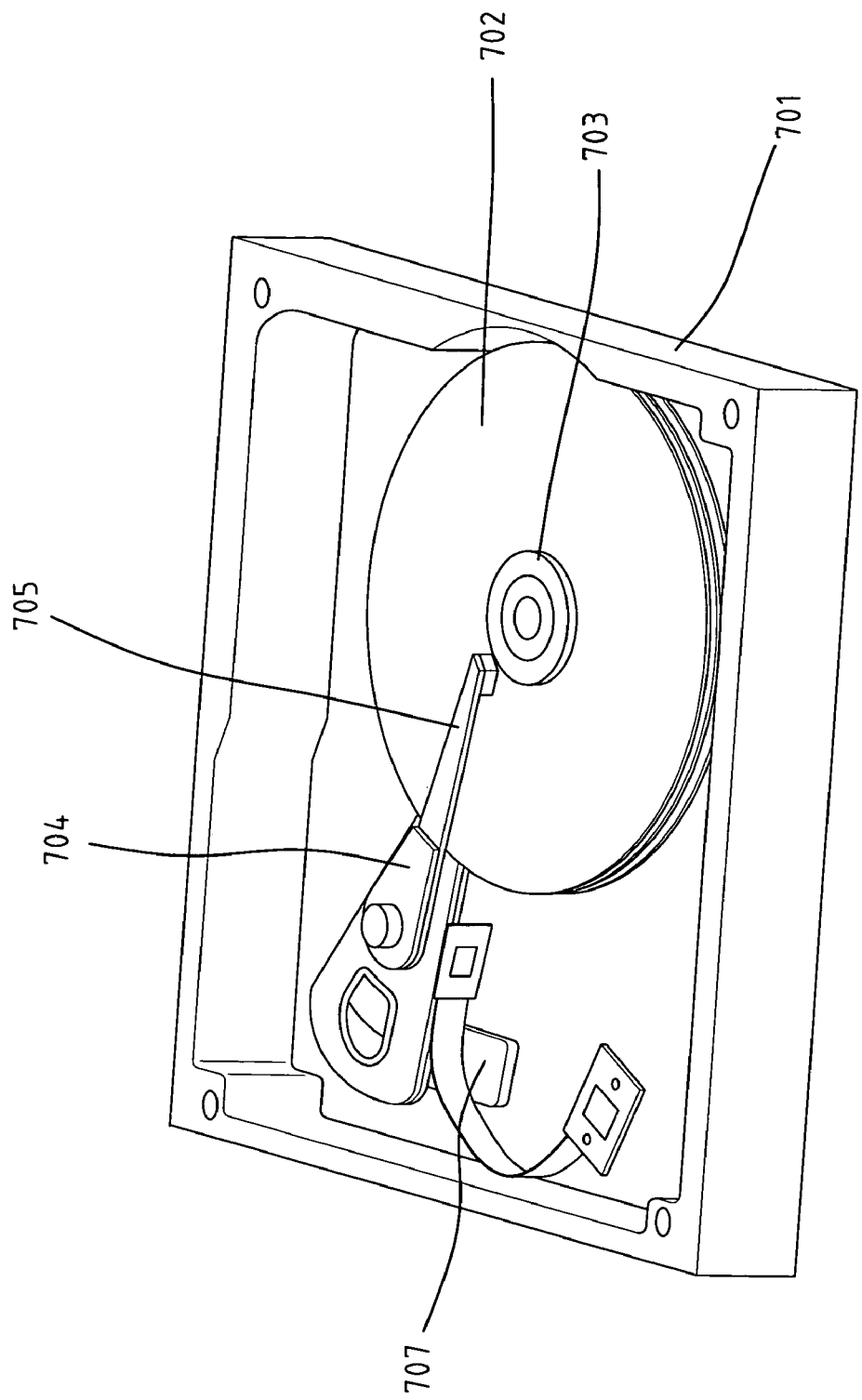
FIG. 1 illustrates the structure of a conventional disk drive.
Figure 2A:
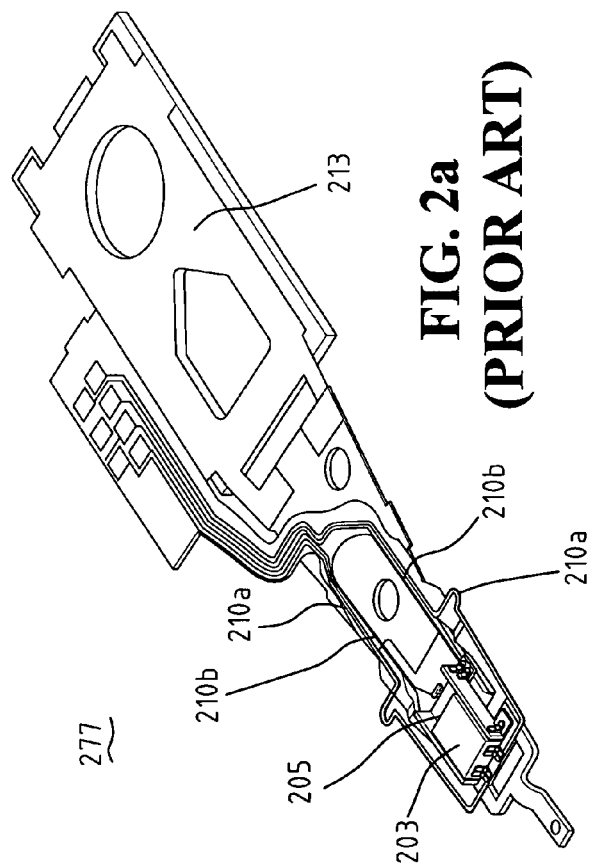
FIG. 2a is a perspective view of a conventional HGA.
Figure 2B:
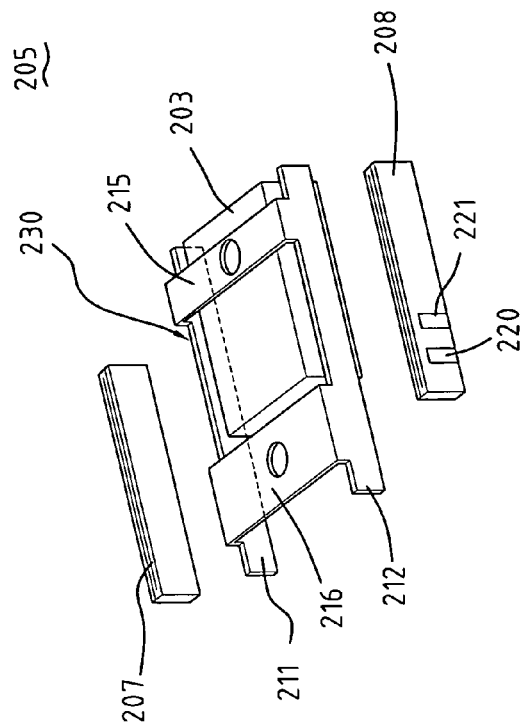
FIG. 2b illustrates a detail structure view of a conventional PZT micro-actuator.
Figure 2D:
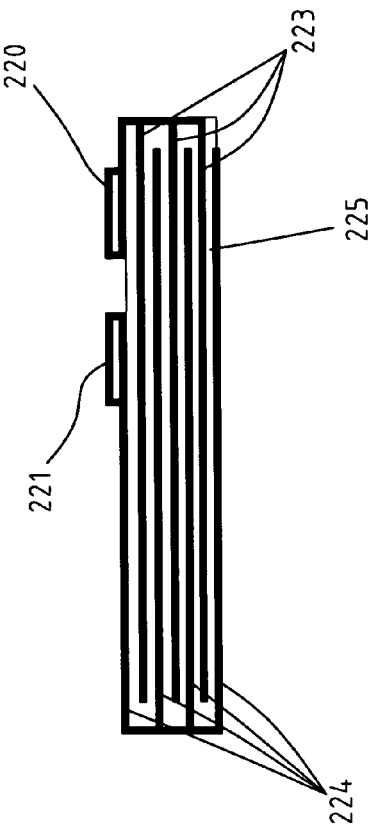
FIG. 2d is a cross-sectional view of the PZT element of the conventional micro-actuator.
Figure 2C:
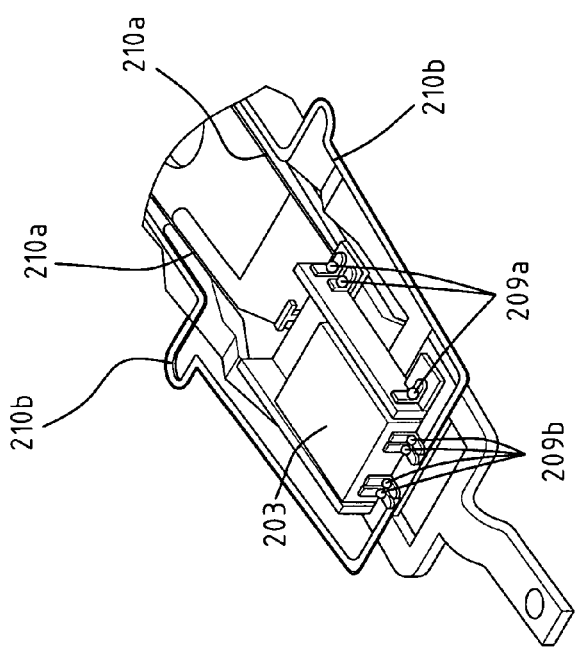
FIG. 2c is a perspective view, in an enlarged scale as compared to FIG. 2a, showing a tongue area of the conventional HGA.
Figure 3:
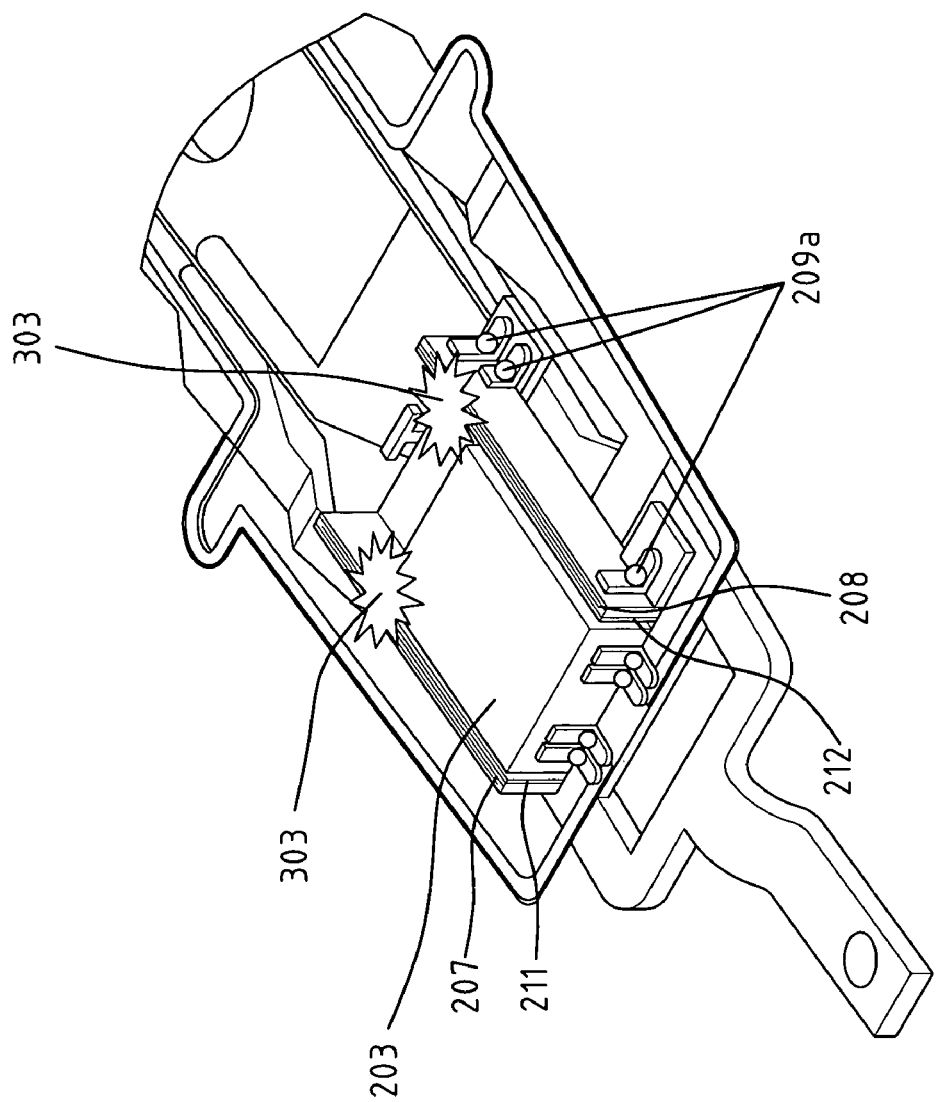
FIG. 3 illustrates an electrode spark problem of the conventional micro-actuator.

Referring to FIGS. 4a and 4b, which show a piezoelectric (PZT) micro-actuator constructed in accordance with a first embodiment of the present invention and a slider received in the PZT micro-actuator, the PZT micro-actuator is designated with reference numeral 205a, and the slider is identical to that of a prior art shown in FIG. 2b and is thus designated with the same reference numeral 203. For purpose of distinction, members or parts that are similar to but different from those of the prior art will be designated with the same reference numeral with a postfix of "a" and identical reference numerals will be used to indicate the parts and members that are identical for both the first embodiment of the present invention and the prior art.

The PZT micro-actuator 205a comprises a metal frame 230 having two side arms 211, 212, a top support arm 215 and a bottom support arm 216 respectively connected with the top ends of the two side arms 211, 212. The two side arms 211, 212 are in parallel with and spaced from each other a distance adapted to hold a slider 203 therebetween that is mounted on the top support arm 215. The top support arm 215 and the bottom support arm 216 are in parallel with each other; and the top support arm 215 is in parallel with a surface of the slider 203. An insulated layer 307, such as polymer, is laminated on an outside surface of the metal frame 230 and in particular on an outside surface of each of the side arms 211, 212. Then, two piezoelectric (PZT) elements 207, 208 each is mounted by epoxy 308 on the insulated layer 307 of each of the side arms 211, 212.

Also referring to FIG. 4c, the insulated layer 307 is sandwiched between the side arms 211, 212 and the PZT elements 207, 208, which are bonded by epoxy 308. Each of the PZT elements 207, 208 has a multi-layered structure of alternately laminating piezoelectric material layers 225 and two electrodes 223, 224; and two electrical contact pads 220, 221 (see FIG. 4a) are coupled to the electrodes 223, 224, respectively.

Owing to the insulated layer 307 being between the PZT elements 207, 208 and the metal frame 230, the metal frame 230 (ground) is electrically insulated with the PZT elements 207, 208 (operation voltage). Hence, when a voltage is input to operate the PZT micro-actuator 205a, an electric spark problem will not occur.

In addition, due to using a metal plate as a main portion of the micro-actuator provided with a high mechanical strength, the treatment of the micro-actuator during assembling of the HGA becomes very easy. By using the metal plate to form the main portion of the micro-actuator, the micro-actuator will be improved in the shape and/or size thereof. Thus, it is enabled to design the micro-actuator with a sufficient stroke. Furthermore, because the metal plate can be easily and precisely machined, a lower cost and a flexible manufacturing process can be attained.

Referring to FIGS. 5a and 5b, which show a PZT micro-actuator constructed in accordance with a second embodiment of the present invention, the PZT micro-actuator, which is designated with reference numeral 205b, comprises a modification of the PZT micro-actuator 205a with reference to FIGS. 4a, 4b and 4c, having the same construction as the PZT micro-actuator 205a but the following difference. In the second embodiment of the present invention, the insulated layer 307 laminated on the outside surface of each of the side arms 211, 212 in the first embodiment is not included therein. Instead, an epoxy 403 with spacers 406, such as glass and SiO$_2$, is used for mounting the PZT elements 207, 208 with the two side arms 211, 212. The spacers 406 keep a specified distance between the PZT elements 207, 208 and the metal frame 230 (ground), which can prevent from causing the electric spark.

Also referring to FIG. 5c, the epoxy 403 with the spacers 406 mounts the PZT elements 207, 208 with the side arms 211, 212 of the metal frame 230, and makes them electrically insulate with each other. Hence, when a voltage is input to operate the PZT micro-actuator 205b, the electric spark problem will not occur.

Referring to FIGS. 6a, 6b and 6c, which show a PZT micro-actuator constructed in accordance with a third embodiment of the present invention, the PZT micro-actuator, which is designated with reference numeral 205c, comprises a modification of the PZT micro-actuator 205a with reference to FIGS. 4a, 4b and 4c, having the same construction as the PZT micro-actuator 205a but the following difference. In the third embodiment of the present invention, the insulated layer 307 laminated on the outside surface of each of the side arms 211, 212 in the first embodiment is not included therein. Instead, the PZT elements 207, 208 forms a substrate layer (insulated layer) 504, such as ceramics and silicon, and then are mounted by epoxy 309 on the outside surfaces of the side arms 211, 212 of the metal frame 230.

Also referring to FIG. 6c, the substrate layer 504 is between the PZF elements 207, 208 and the side arms (common ground) 211, 212. This has great help to prevent from causing the electric spark when operating the micro-actuator 205c.

Figure 7A:
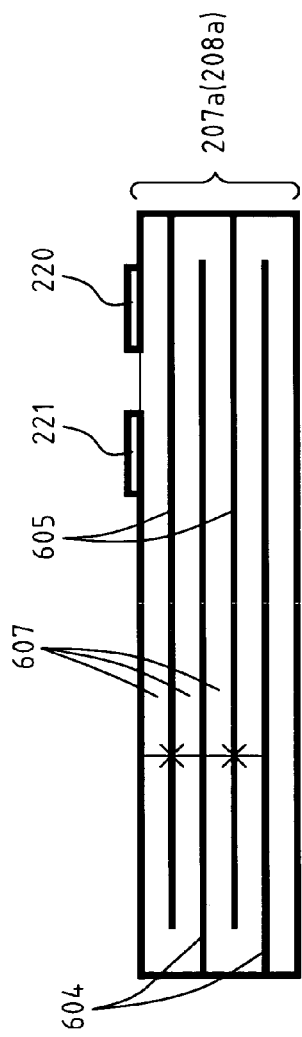
FIG. 7a is a cross-sectional view of a piezoelectric element of a micro-actuator constructed in accordance with a fourth embodiment of the present invention.
Figure 7B:
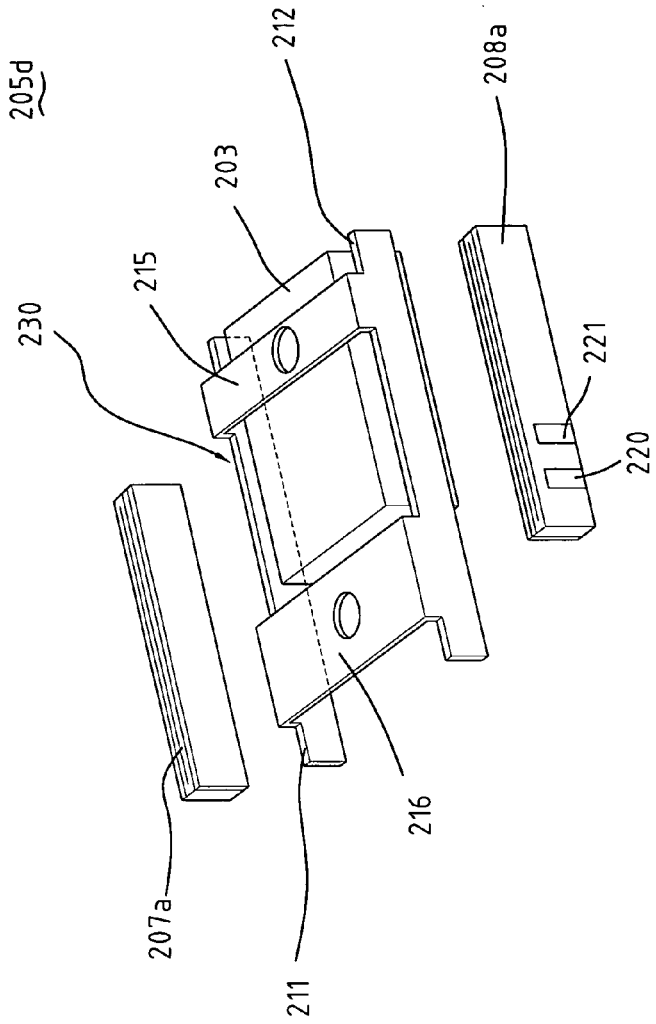
FIG. 7b illustrates a detail structure view of the micro-actuator constructed in accordance with the fourth embodiment of the present invention with a slider received therein.

Referring to FIGS. 7a and 7b, which show a PZT micro-actuator constructed in accordance with a fourth embodiment of the present invention, the PZT micro-actuator, which is designated with reference numeral 205d, comprises a modification of the PZT micro-actuator 205a with reference to FIGS. 4a, 4b and 4c, having the same construction as the PZT micro-actuator 205a but the following difference. In the fourth embodiment of the present invention, the insulated layer 307 laminated on the outside surface of each of the side arms 211, 212 in the first embodiment is not included therein. Instead, the PZT elements 207a, 208a of the fourth embodiment has a little different structure from the PZT elements 207, 208 of the first embodiment. The PZT elements 207a, 208a also has a multi-layered structure of alternately laminating piezoelectric material layers 607 and two electrodes 604, 605, but forms an inactive layer on a bottom layer thereof that is not polarized and keeps itself inactive. Since the piezoelectric material is a ceramic, this will prevent from conducting electricity between the PZT elements 207a, 208a and the side arms (common ground) 211, 212 when the PZT elements 207a, 208a are mounted on the outside surface of the side arms 211, 212 of the metal frame 230. Thus this is great help to prevent from causing the electric spark when operating the micro-actuator 205d.

In the present invention, the metal frame 230 is not limited to the structure as illustrated on the drawings, for example, the metal frame 230 maybe has only a support arm to connect the two side arms 211, 212; or the top support arm 215 and the bottom support arm 216 have any other suitable shapes or structures.

Figure 8:
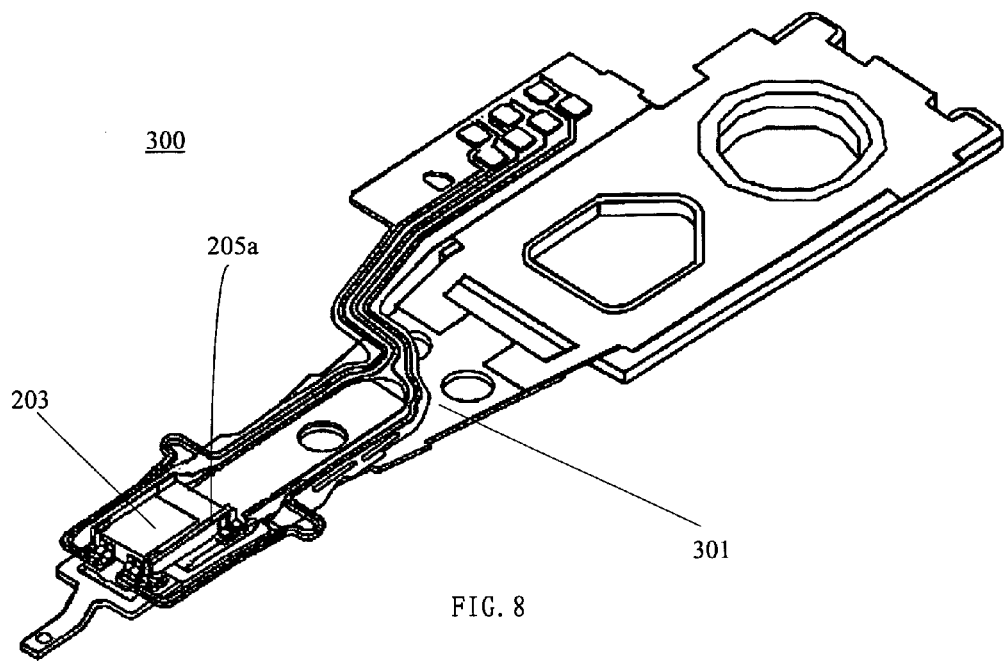
FIG. 8 is a perspective view of a HGA with the micro-actuator in FIG. 4b.

In the present invention, referring to FIG. 8, a HGA 300 comprises a suspension 301 which is supporting the slider 203 and the PZT micro-actuator 205a. The PZT micro-actuator 205a can be mounted on the suspension 301 physically and electrically. Selectively, the HGA of the invention may comprises the PZT micro-actuator 205b, 205c or 205d instead of the PZT micro-actuator 205a. As an embodiment, the suspension 301 may comprise a base plate, a hinge, a flexure and a load beam which are assembled together. Understandably, the suspension may have any suitable structure for the PZT micro-actuator of the invention to mount thereon.

Figure 9:
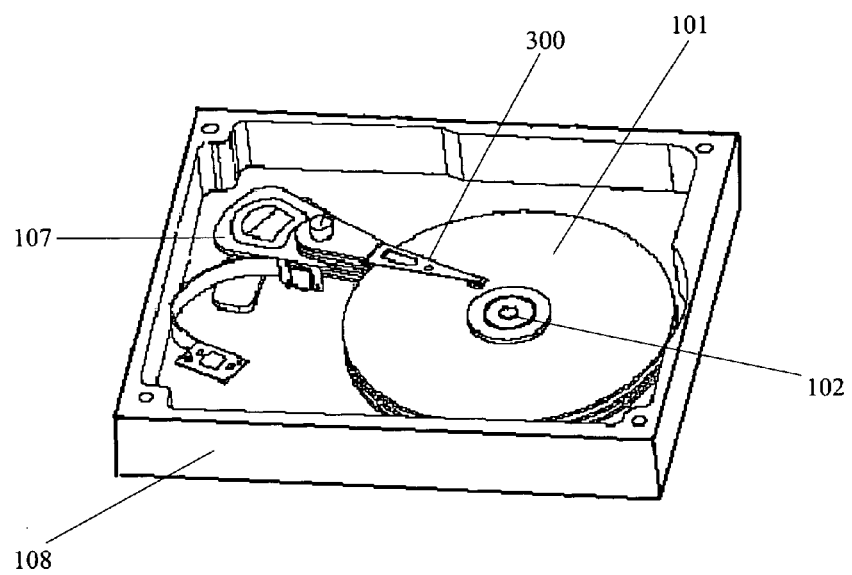
FIG. 9 is a perspective view of a disk drive unit with the HGA in FIG. 8.

In the present invention, referring to FIG. 9, a disk drive unit of the present invention can be attained by assembling a housing 108, a disk 101, a spindle motor 102, a VCM 107 with the HGA 300 of the present invention. Because the structure and/or assembly process of disk drive unit of the present invention are well known to persons ordinarily skilled in the art, a detailed description of such structure and assembly is omitted herefrom.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A micro-actuator comprising:
   a metal frame having two side arms, and at least one support arm connected with the two side arms, the two side arms being in parallel with and spaced from each other a distance adapted to hold a slider therebetween that is mounted on the support arm;
   an isolation layer coupled with each side arm of the metal frame; and
   a piezoelectric element to bond with the isolation layer.

2. The micro-actuator as claimed in claim 1, wherein the isolation layer is an insulated layer laminated on each side arm of the metal frame.

3. The micro-actuator as claimed in claim 2, wherein the insulated layer material comprises polymer.

4. The micro-actuator as claimed in claim 1, wherein the isolation layer is an epoxy layer with spacers, which is used for mounting the piezoelectric element with each side arm of the metal frame and keeping them from a specified distance.

5. The micro-actuator as claimed in claim 4, wherein the spacer material comprises glass and $SiO_2$.

6. The micro-actuator as claimed in claim 1, wherein the isolation layer is a substrate layer formed on the piezoelectric element.

7. The micro-actuator as claimed in claim 6, wherein the substrate layer material comprises ceramics and silicon.

8. The micro-actuator as claimed in claim 1, wherein the isolation layer is an inactive layer that is a bottom layer of a multi-layered structure of the piezoelectric element and is not polarized.

9. A method of forming a micro-actuator with electric spark preventing structure, comprising the steps of:
   providing a metal frame having two side arms, and at least one support arm connected with the two side arms, the two side arms being in parallel with and spaced from each other a distance adapted to hold a slider therebetween that is mounted on the support arm;
   forming an insulated layer to couple with each side arm of the metal frame; and
   providing a piezoelectric element to bond with the insulated layer.

10. The method as claimed in claim 9, wherein the insulated layer is formed by being laminated on each side arm of the metal frame.

11. The method as claimed in claim 9, wherein the insulated layer is formed by using an epoxy with spacers to mount the piezoelectric element to each side arm of the metal frame.

12. The method as claimed in claim 9, wherein the insulated layer is formed by providing a substrate layer on a surface of the piezoelectric element that is coupled with each side arm of the metal frame.

13. The method as claimed in claim 9, wherein the insulated layer is formed by providing an inactive layer on a bottom layer of a multi-layered structure of the piezoelectric element that is coupled with each side arm of the metal frame,
   bonding the piezoelectric element to the inactive layer, wherein the inactive layer faces to the metal frame.

14. A head gimbal assembly comprising:
   a slider;
   a micro-actuator; and
   a suspension to load the slider and the micro-actuator; wherein the micro-actuator comprising:
   a metal frame having two side arms, and at least one support arm connected with the two side arms, the two side arms being in parallel with and spaced from each other a distance adapted to hold the slider therebetween that is mounted on the support arm;
   an isolation layer coupled with each side arm of the metal frame; and
   a piezoelectric element to bond with the isolation layer.

15. The head gimbal assembly as claimed in claim 14, wherein the isolation layer is an insulated layer laminated on the outside surface of each side arm of the metal frame.

16. The head gimbal assembly as claimed in claim 15, wherein the insulated layer material comprises polymer.

17. The head gimbal assembly as claimed in claim 14, wherein the isolation layer is an epoxy layer with spacers, which is used for mounting the piezoelectric element with the outside surface of each side arm of the metal frame and keeping them from a specified distance.

18. The head gimbal assembly as claimed in claim 17, wherein the spacer material comprises glass and $SiO_2$.

19. The head gimbal assembly as claimed in claim 14, wherein the isolation layer is a substrate layer formed on the piezoelectric element.

20. The head gimbal assembly as claimed in claim 19, wherein the substrate layer material comprises ceramics and silicon.

21. The head gimbal assembly as claimed in claim 14, wherein the isolation layer is an inactive layer that is a bottom layer of a multi-layered structure of the piezoelectric element and is not polarized.

22. A disk drive unit comprising:
   a head gimbal assembly including a micro-actuator, a slider, and a suspension that supports the micro-actuator and slider;
   a drive arm connected to the head gimbal assembly;
   a disk; and
   a spindle motor operable to spin the disk; wherein the micro-actuator comprising:
   a metal frame having two side arms, and at least one support arm connected with the two side arms, the two side arms being in parallel with and spaced from each other a distance adapted to hold the slider therebetween that is mounted on the support arm;
   an isolation layer coupled with each side arm of the metal frame; and
   a piezoelectric element to bond with the isolation layer.

* * * * *